(12) United States Patent  (10) Patent No.: US 7,283,179 B2
Suzuki  (45) Date of Patent: Oct. 16, 2007

(54) LIQUID CRYSTAL TELEVISION APPARATUS

(75) Inventor: Hirotsugu Suzuki, Daito (JP)

(73) Assignee: Funal Electric Co., Ltd., Dalto-shi, Osaka (JP)

( * ) Notice: Subject to any disclaimer, the term of this patent is extended or adjusted under 35 U.S.C. 154(b) by 515 days.

(21) Appl. No.: 10/866,619

(22) Filed: Jun. 12, 2004

(65) Prior Publication Data
US 2005/0018094 A1    Jan. 27, 2005

(30) Foreign Application Priority Data
Jun. 12, 2003  (JP) .............................. 2003-167233

(51) Int. Cl.
*H04N 5/52*    (2006.01)
(52) U.S. Cl. ...................... 348/678; 348/790; 348/690; 348/712
(58) Field of Classification Search ................ 348/790, 348/670, 673, 674, 675, 677, 679, 686, 687, 348/690, 572, 573
See application file for complete search history.

(56) References Cited

U.S. PATENT DOCUMENTS 6,201,566 B1 *  3/2001  Harada et al. ................. 348/51
6,850,214 B2 *  2/2005  Nishitani et al. .............. 345/87
7,095,451 B2 *  8/2006  Kitazawa et al. ........... 348/679

FOREIGN PATENT DOCUMENTS

JP    H11-177903    7/1999

* cited by examiner

*Primary Examiner*—Michael H. Lee
(74) *Attorney, Agent, or Firm*—Peter Ganjian

(57) ABSTRACT

Disclosed herein is a video signal process circuit that includes a control circuit having a level detection circuit and a dynamic range switch circuit. In the control circuit and a microcomputer, an average luminance of an image displayed on a liquid crystal panel via a liquid crystal driver circuit is detected. When the average luminance is equal to or over a level YSmax, an upper limit of the dynamic range is expanded, so that a signal level of a composite video signal in which white blur can occur can be digitized to a digital signal without being limited by the upper limit gradation, reducing the white blur of the image to improve the quality of the image.

7 Claims, 14 Drawing Sheets

LIQUID CRYSTAL TELEVISION APPARATUS

BACKGROUND OF THE INVENTION

1. Field of the Invention

The present invention relates to a liquid crystal television apparatus. Particularly, the present invention relates to a liquid crystal television apparatus for inputting a video signal formed of an analog signal and displaying an image based on a digital signal to which the video signal is converted.

2. Description of the Related Art

In conventional liquid crystal television apparatuses, when a computer is connected with a display, a level width of an analog video signal a outputted from the computer is registered in a memory. For example, even when the level width is other than 0.7 V and 1.0 V, a value of a contrast control signal outputted from a microcomputer is adjusted so that a white level of an analog signal b, to which the analog video signal a set to a white level is amplified by a video amplifier, is equal to an optimum white level of the analog video signal b, the optimum white level being registered in the memory and adapted for a characteristic of the display. Then, in accordance with relationship between a level width of the analog video signal a and a level width of the analog video signal b, an adequate contrast image is displayed on the display (for example, see patent Document 1). An apparatus similar to the liquid crystal television apparatuses is disclosed in JP-A No. 188195/1992.

Patent Document

JP-A No. 177903/1999

In the conventional liquid crystal television apparatuses, the contrast is adjusted in accordance with the white level, so that this adjustment is in accordance with a test image of one screen having only white. After the adjustment using the test image, the contrast control signal is fixed. Therefore, when a video can be changed, dynamic image quality adjustment adapted for the video is impossible.

SUMMARY OF THE INVENTION

For solving the above-described problem, an object of the present invention is to provide a liquid crystal television apparatus in which an image quality can be dynamically adjusted in accordance with an inputted analog video signal.

To achieve the above-described object, according to a first aspect of the present invention, a liquid crystal television apparatus comprises:

a liquid crystal panel whose display surface is formed of a plurality of pixels;

a tuner for receiving a television signal of a desired frequency corresponding to a television broadcast band via an antenna, for selecting only a required signal selected from the received television signal and applying high frequency amplification to the selected signal, and for outputting an analog video signal converted to an intermediate frequency signal;

an analog-to-digital conversion circuit for inputting the analog video signal from the tuner and for converting a predetermined signal level range of the analog video signal to a digital signal having gradation corresponding to the signal levels;

a signal process circuit for generating a digital video signal by applying digital signal process to the converted digital signal;

a flame memory circuit for storing a digital video signal forming an image for one screen displayed on the liquid crystal panel while inputting the generated digital video signal;

a liquid crystal driver circuit for displaying the image on the liquid crystal panel while applying a predetermined signal process to the digital video signal stored in the flame memory circuit;

a microcomputer for controlling each circuit; wherein the analog-to-digital conversion circuit changes the signal level range; and wherein the apparatus further comprises:

an image luminance detection circuit for detecting a luminance of a predetermined area of the image or an average luminance of a plurality of areas of the image in accordance with the digital video signal stored in the flame memory;

a determination circuit for determining whether the detected luminance of the predetermined area or the average luminance of a plurality of the areas is equal to or over a threshold showing that the image is bright; and a conversion control circuit for outputting a predetermined control signal to the analog-to-digital conversion circuit and expanding an upper limit of a signal level range of the analog video signal converted to the digital signal to change the signal level range when the detected luminance of the predetermined area or the average luminance of a plurality of the areas is equal to or over the threshold.

In the liquid crystal television apparatus of the present invention, when the image is displayed on the liquid crystal panel formed of a plurality of pixels, the tuner receives a television signal of a desired frequency corresponding to a television broadcast band via the antenna, selects only a required signal from the received television signal, applies high frequency amplification to the selected signal, and outputs an analog video signal converted to an intermediate frequency signal. The analog-to-digital conversion circuit inputs the analog video signal from the tuner, and converts a predetermined signal level range of the analog video signal to a digital signal of gradation corresponding to the signal levels. The signal process circuit applies a predetermined digital signal process to the converted digital signal to generate a digital video signal.

The flame memory circuit stores the digital video signal forming the image for one screen displayed on the liquid crystal panel while inputting the digital video signal generated in the signal process circuit. The liquid crystal driver circuit displays the image on the liquid crystal panel while applying a predetermined signal process to the digital video signal stored in the flame memory circuit. At this time, the microcomputer controls the above-described circuits to achieve a function of the liquid crystal television apparatus. The analog-to-digital conversion circuit, which inputs the analog video signal and converts it to the digital signal, functions using the upper and lower limits of the signal level range as the dynamic range, as described above. In this case, a portion in which the signal level of the inputted analog video signal is over the dynamic range is quantized to the upper limit gradation. In other words, the portion becomes white blur. In such a manner, when the white blur occurs, the quality of the image decreases.

In the first aspect of the present invention, the image luminance detection circuit detects a luminance of the predetermined area of the image or an average luminance of a plurality of the areas of the image. The determination circuit determines whether the detected luminance of the predetermined area of the image or average luminance of a plurality of the areas is equal to or over the threshold showing that the image is bright. The analog-to-digital conversion circuit of the present invention makes the above-described signal level range changeable, in other words, makes the dynamic range changeable. When the luminance of the predetermined area of the image or average luminance of a plurality of the areas is determined to be equal to or over the threshold, the luminance and average luminance being detected in the determination circuit, the conversion control circuit outputs the predetermined control signal to the analog-to-digital conversion circuit to expand the upper limit of the signal level range of the analog video signal to be converted to the digital signal. In other words, the upper limit of the dynamic range is expanded. As a result, the signal level range of the analog video signal in which the white blur can occur can be converted to the digital signal without being limited by the upper limit gradation, reducing the white blur to improve the quality of the image.

The present invention is effective not only as the configuration embodied in the above-described liquid crystal television apparatus, but also as a method for changing the signal level range of the analog-to-digital conversion circuit, in other words, the dynamic range, in accordance with the luminance of the image. In a second aspect of the present invention, a liquid crystal television apparatus for generating a digital video signal in accordance with an analog video signal and displaying an image based on the digital video signal on pixels of a liquid crystal panel includes: an analog video signal input circuit for inputting the analog video signal; a digital video signal generation circuit for generating a digital video signal while converting the analog video signal having a signal level range defined by predetermined upper and lower limits to a digital signal having gradation corresponding to the signal levels; an image luminance detection circuit for detecting a luminance of the image in accordance with the generated digital video signal; and a conversion control circuit for determining whether the detected luminance is equal to or over a predetermined threshold showing that an image is bright and for expanding the upper limit of the signal level range when the luminance is equal to or over the predetermined threshold.

In the second aspect of the present invention, the liquid crystal television apparatus is provided to generate the digital video signal in accordance with the analog video signal and to display the image based on the digital video signal on the pixels of the liquid crystal panel. At this time, the analog video signal input circuit inputs the analog video signal, and the digital video signal generation circuit generates the digital video signal while converting the analog video signal of the signal level range defined by the predetermined upper and lower limits to the digital signal having gradation corresponding to the signal levels. The image luminance detection circuit detects the luminance of the image in accordance with the generated digital video signal. The conversion control circuit determines whether the luminance detected in the image luminance detection circuit is equal to or over the predetermined threshold, and expands the upper limit of the signal level range when the luminance is equal to or over the threshold. In other words, the upper limit of the dynamic range is expanded.

According to a third aspect of the present invention, in the liquid crystal television apparatus according to the second aspect, the conversion control circuit determines whether the detected luminance is equal to or under the threshold showing that the image is dark, and expands the lower limit of the signal level range when the detected luminance is equal to or under the threshold.

In this third aspect of the present invention, the conversion control circuit determines whether the luminance detected in the image luminance detection circuit is equal to or under the threshold showing that the image is dark. The conversion control circuit expands the lower limit of the signal level range when the detected luminance is equal to or under the threshold. In other words, the lower limit of the dynamic range is expanded.

According to a forth aspect of the present invention, in the liquid crystal television apparatus according to any one of the second and third aspects, the image luminance detection circuit detects an average luminance of pixels of a predetermined area of the image when detecting a luminance of the image.

In this forth aspect of the present invention, the image luminance detection circuit, when detecting the luminance of the image, detects the average luminance of the pixels in the predetermined area of the image. The predetermined area is not especially limited. The area may be any portion of the image. For example, a main portion of the video is often displayed on the center portion of the image. Therefore, by detecting the center portion, the main portion of the image, the luminance of the main portion can be used for the change of the dynamic range.

According to a fifth aspect of the present invention, in the liquid crystal television apparatus according to any one of the second and third aspects, the image luminance detection circuit detects an average luminance of pixels of a plurality of the areas of the image when detecting the luminance of the image. In the fifth aspect of the present invention, the image luminance detection circuit, when detecting the luminance of the image, detects the average luminance of the pixels in a plurality of the areas of the image. By detecting the average luminance of a plurality of the areas, the luminance trend of the overall image can be detected. Therefore, the luminance condition of the overall image can be used for the change of the dynamic range.

According to a sixth aspect of the present invention, in the liquid crystal television apparatus according to the second aspect, the image luminance detection circuit detects the luminance every predetermined time.

In the sixth aspect of the present invention, the image luminance detection circuit detects the average luminance of the predetermined area or a plurality of the areas of the image every predetermined time.

According to a seventh aspect of the present invention, in the liquid crystal television apparatus according to any one of the second to sixth aspects, the conversion control circuit calculates a difference between the detected luminance and the threshold showing that the image is bright, and expands the upper limit in accordance with the calculated difference. In the seventh aspect of the present invention, the conversion control circuit calculates the difference between the luminance detected in the image luminance detection circuit and the threshold showing that the image is bright, and expands the upper limit of the dynamic range in accordance with the calculated difference.

According to an eighth aspect of the present invention, in the liquid crystal television apparatus according to the second aspect, the conversion control circuit calculates a difference between the detected luminance and a threshold showing that the image is dark, and expands the lower limit in accordance with the calculated difference.

In the eighth aspect of the present invention, the conversion control circuit calculates the difference between the luminance detected in the image luminance detection circuit and the threshold showing that the image is dark, and expands the lower limit of the dynamic range in accordance with the calculated difference.

As described above, in the liquid crystal television apparatus of the present invention, by dynamically expanding the upper limit of the signal level range in accordance with the inputted analog video signal, the analog video signal in which the white blur can occur can be converted to the digital signal without being limited by the upper gradation, and the white blur can be reduced to improve the quality of the image.

In the liquid crystal television apparatus according to the second aspect of the present invention, when the luminance of the image displayed in accordance with the digital video signal is high (the image is bright), the analog video signal which can be limited by the upper limit gradation when converted to the digital signal can be properly digitized by expanding the upper limit of the dynamic range, and the white blur which can occur in the image can be reduced.

According to the third aspect of the present invention, when the luminance of the image displayed in accordance with the digital video signal is low (the image is dark), the analog video signal which can be limited by the lower limit gradation when converted to the digital signal can be properly digitized by expanding the lower limit of the dynamic range, and the black blur which can occur in the image can be reduced. According to the forth aspect of the present invention, the average luminance of the predetermined area can be used for the change of the dynamic range.

According to the fifth aspect of the present invention, the average luminance of the overall image can be used for the change of the dynamic range.

According to the sixth aspect of the present invention, the process load can be reduced. According to the seventh aspect of the present invention, the dynamic range can be changed in accordance with the brightness of the image.

According to the eighth aspect of the present invention, the dynamic range can be changed in accordance with the darkness of the image.

Other and further objects, features and advantages of the invention will appear more fully from the following description.

DETAILED DESCRIPTION OF THE PREFERRED EMBODIMENTS

Embodiments of the present invention are explained below in the following order.

Figure 1:
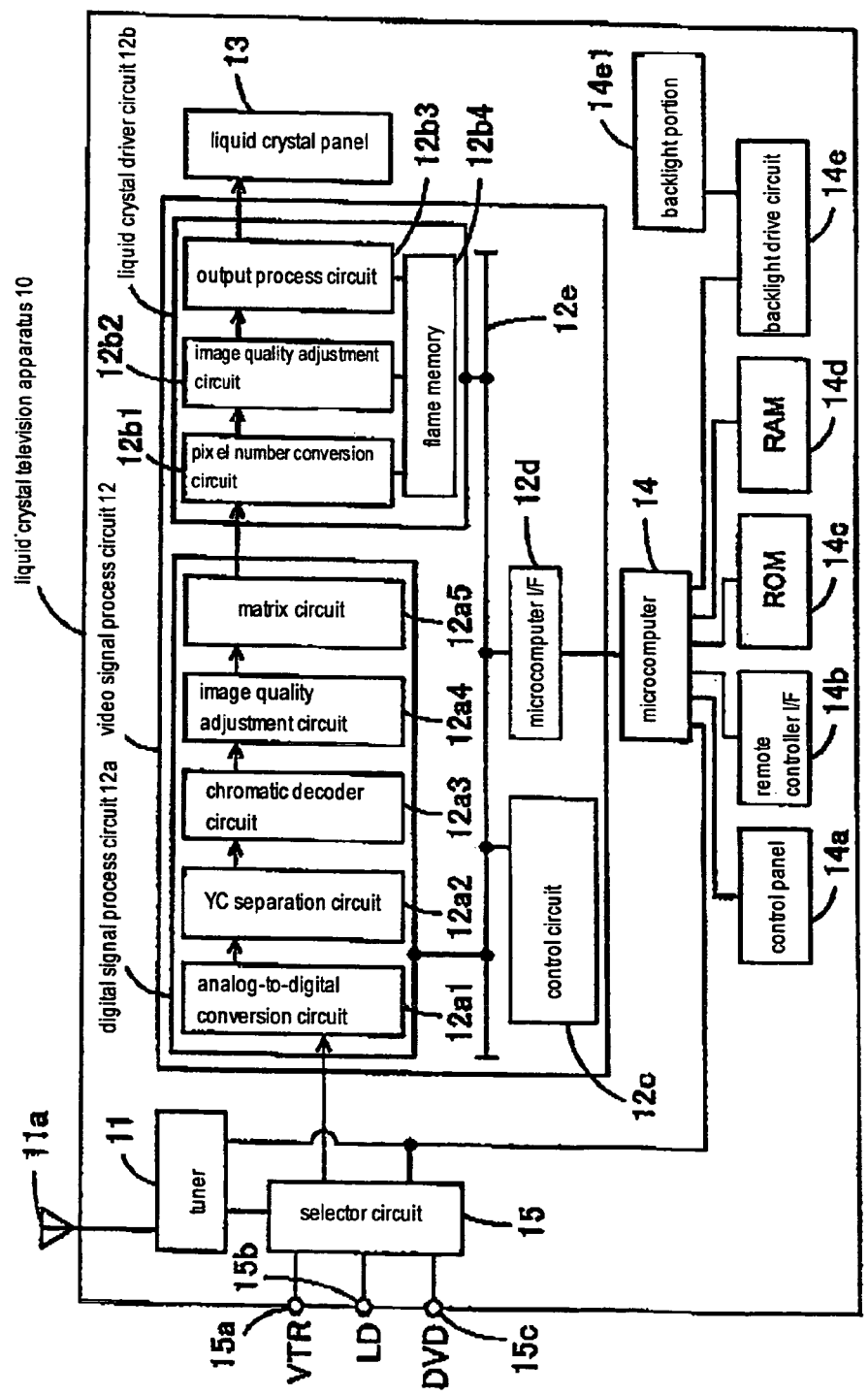
FIG. 1 is a block diagram showing a configuration in one embodiment of a liquid crystal television apparatus of the present invention.

(1) Configuration of a liquid crystal television apparatus (2) Configuration of a control portion (3) Procedure of a control process (4) Alternatives (5) Relationship between the embodiments and the present invention (6) Conclusion (1) Configuration of a Liquid Crystal Television Apparatus FIG. 1 is a block diagram showing a configuration of an embodiment of a liquid crystal television apparatus of the present invention. In FIG. 1, a liquid crystal television apparatus 10 mainly includes a tuner 11, a video signal process circuit 12, a liquid crystal panel 13, a microcomputer 14, and a selector circuit 15. The video signal process circuit 12 includes in its inside a digital signal process circuit 12a and a liquid crystal driver circuit 12b. A control circuit 12c is connected with a microcomputer I/F 12d via a bass 12e such as an IIC bass. This microcomputer I/F is connected with the microcomputer 14, which can control each circuit of the video signal process circuit 12 via the microcomputer I/F 12d.

The microcomputer 14 is connected with a control panel 14a, a remote controller I/F 14b, a ROM 14c, a RAM 14d, and a backlight drive circuit 14e. The microcomputer 14 reads various control programs previously stored in the ROM 14c, executes them by using the RAM 14d as a work area, and controls the above-described circuits. The backlight drive circuit 14e is connected with a backlight portion 14e1. A resolution of the liquid crystal panel 13 is not limited. The resolution may be a size of 640×480 pixels (VGA size) or a size of 1024×768 pixels (XGA size). The backlight portion 14e1 connected with the backlight drive circuit 14e is located in a rear surface of the liquid crystal panel 13. Luminous elements almost the same as pixels of the liquid crystal panel 13 are arranged in a matrix configuration. Each luminous element is driven by the backlight drive circuit 14e in accordance with control of the microcomputer 14 and emits at a predetermined luminance.

The tuner 11, which is adapted for analog televisions, receives television broadcast waves via an antenna 11 connecting to the tuner. Television broadcast signals (composite video signals) as analog video signals based on the received television broadcast waves are output from the tuner 11. The liquid crystal television apparatus 10 includes, as external input terminals, an external input terminal 15a for inputting analog video signals (composite video signals) from a VTR, an external input terminal 15b for inputting analog video signals (composite video signals) from a LD player, and an external input terminal 15c for inputting analog video signals (composite video signals) from a DVD player.

The tuner 11 and the external input terminals 15a to 15c are connected with the selector circuit 15, in which one composite video signal is selected from a composite video signal (television broadcast signal) outputted from the tuner 11, a composite video signal inputted from the external input terminal 15a, a composite video signal from the external input terminal 15b, and a composite video signal from the external input terminal 15c. This selection is executed from the control panel 14a and from a remote controller via the remote controller I/F 14b. The composite video signal selected by the selector circuit 15 is transmitted to the video signal process circuit 12. The transmitted composite video signal is inputted to the digital signal process circuit 12a in the video signal process circuit 12.

The digital signal process circuit 12a includes an analog-to-digital conversion circuit 12a1, a Y/C separation circuit 12a2, a chromatic decoder circuit 12a3, an image adjustment circuit 12a4, and a matrix circuit 12a5. In this configuration, the digital-to-analog conversion circuit 12a1, when inputting a composite video signal, converts a predetermined signal level range between a white level and black level of the composite video signal to a digital signal having gradation corresponding to the signal levels. The subsequent predetermined signal processes are executed in accordance with this digital signal. The Y/C separation circuit 12a2 separates the digital signal to a Y signal and a C signal. After the separation, the Y signal and C signal are inputted to the chromatic decoder circuit 12a3, and outputted as a YUV signal after applied a predetermined signal process.

An image quality adjustment circuit 12a4 of the digital signal process circuit 12a adjusts sharpness, color, and TINT of the YUV signal. The matrix circuit 12a5 applies RGB matrix transformation to the adjusted YUV signal to generate an RGB signal. The generated RGB signal is transmitted to the liquid crystal driver circuit 12b. The liquid crystal driver circuit 12b includes a pixel number change circuit 12b1, an image quality adjustment circuit 12b2, an output process circuit 12b3, and a flame memory 12b4. The pixel number conversion circuit 12b1 inputs the RGB signal generated in the digital signal process circuit 12a, and scales the RGB signal to generate a RGB signal for one screen displayed on the liquid crystal panel 13. The RGB signal for one screen is stored in the flame memory 12b4.

The image quality adjustment circuit 12b2 of the liquid crystal driver circuit 12b adjusts brightness, contrast, black balance, and white balance of the RGB signal scaled in the pixel number conversion circuit 12b1 and stored in the flame memory 12b4. The output process circuit 12b3 applies, for example, gamma correction and dithering to the RGB signal whose image quality is adjusted in the image quality adjustment circuit 12b2, adds, for example, a background signal, an OSD signal, and a blanking signal to the RGB signal, and outputs the RGB signal to the liquid crystal panel 13, on which the image is displayed.

Figure 2:
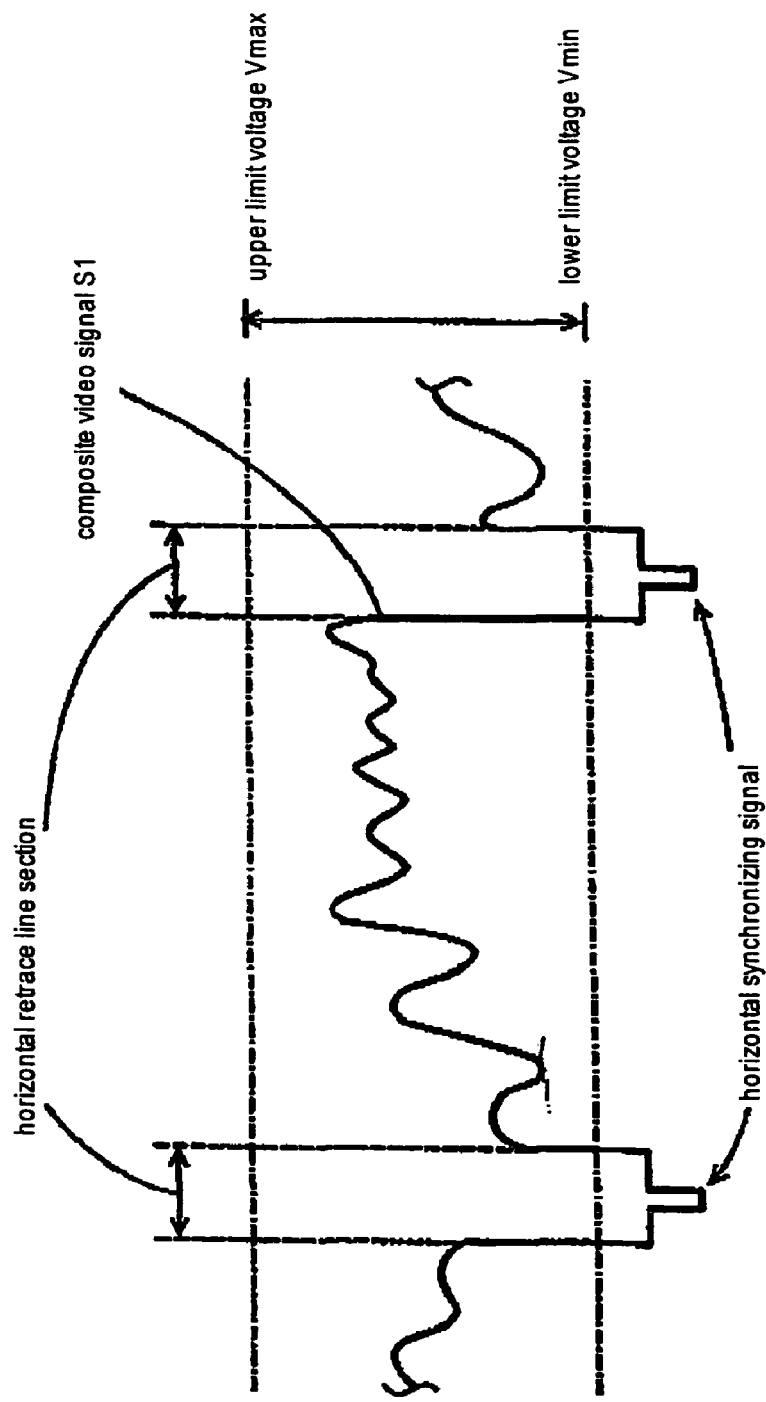
FIG. 2 is a block diagram showing a configuration of a composite video signal.
Figure 3:
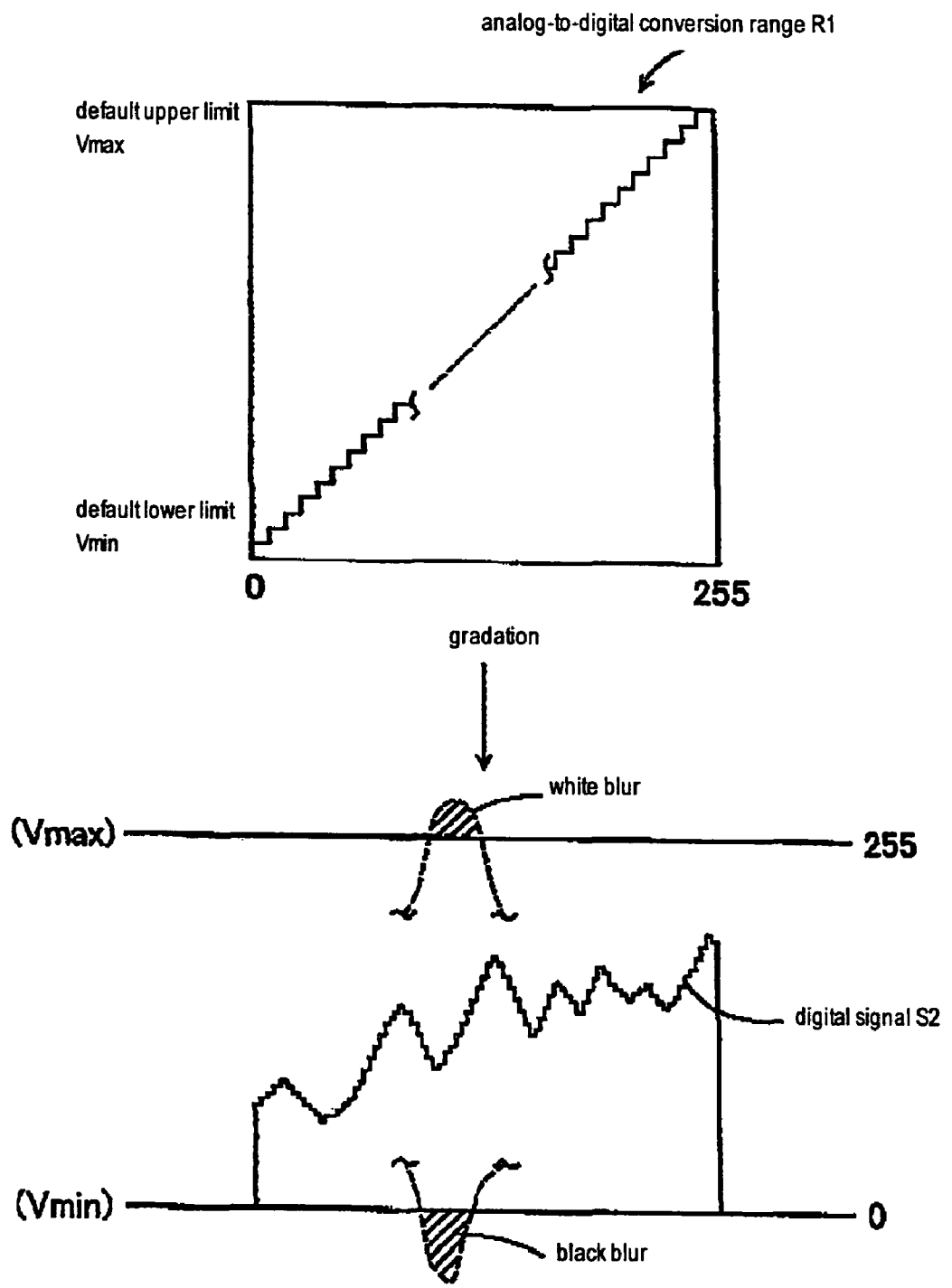
FIG. 3 is a block diagram showing a configuration of a default analog-to-digital conversion range.

As described above, the composite video signal inputted from the source selected by the selector circuit 15 is inputted to the analog-to-digital conversion circuit 12a1 of the digital signal process circuit 12a and converted to the digital signal. The image of the digital video signal generated in accordance with the digital signal is displayed on the liquid crystal panel 13. One example of the composite video signal inputted to the analog-to-digital conversion circuit 12a1 is shown in FIG. 2. In FIG. 2, a composite video signal S1 includes horizontal retrace line sections and horizontal synchronizing signals, between which sections a video signal is combined. The analog-to-digital conversion circuit 12a1 converts a signal level range formed by a maximum voltage Vmax showing a white level and a minimum voltage Vmin showing a black level of the inputted composite video signal S1 to a digital signal having gradation corresponding to the signal levels. Concretely, in accordance with an analog-to-digital conversion range R1 shown in FIG. 3, this signal level range is quantized to a 0 to 255 gradation to generate a digital signal S2. In other words, a range formed of the maximum voltage Vmax and minimum voltage Vmin is a dynamic range.

At this time, when the composite video signal S1 having a signal level equal to or over the maximum voltage Vmax of a predetermined signal level range or equal to under the minimum voltage Vmin of the predetermined signal level range is converted, this composite video signal S1 cannot be correctly quantized. In other words, the composite video signal S1 equal to or over the maximum voltage Vmax is all converted to the 255 gradations. As a result, an image of the composite video signal S1 is in white blur condition. The composite video signal S1 equal to or under the minimum voltage Vmin is all converted to the 0 gradation. As a result, an image of the composite video signal S1 is in black blur condition. In such a manner, when white blur and black blur occur in the image, the image quality decreases. In this embodiment, the video signal process circuit 12 includes the control circuit 12c. The control circuit 12c and the microcomputer 14 detect luminance condition of an image displayed on the liquid crystal panel 13 via the liquid crystal driver circuit 12b, and control the digital signal process circuit 12a in accordance with the luminance condition of the image to reduce the white blur or black blur. This function is explained below.

(2) Configuration of a Control Circuit

Figure 4:
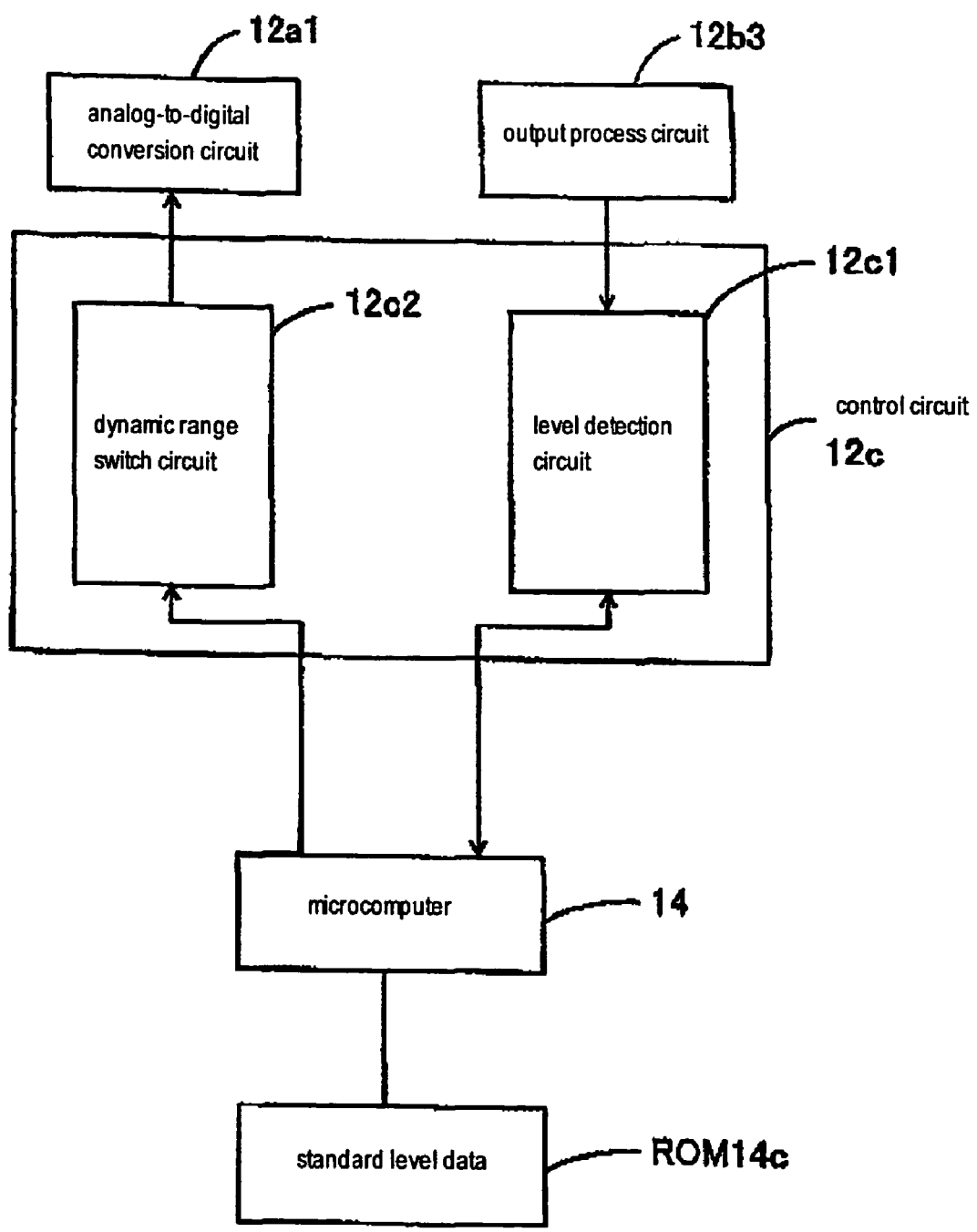
FIG. 4 is a block diagram showing a configuration of a control circuit.

FIG. 4 is a block diagram showing a configuration of the control circuit 12c. In FIG. 4, the control circuit 12c includes a level detection circuit 12c1 and a dynamic range switch circuit 12c2. The level detection circuit 12c1 is connected with the output process circuit 12b3 of the liquid crystal driver circuit 12b via the bass 12e. The level detection circuit 12c1 and dynamic range switch circuit 12c2 are connected with the microcomputer 14 via the microcomputer I/F 12d. In this configuration, the level detection circuit 12c1 obtains an RGB signal of an image outputted from the output process circuit 12b3 and displayed on the liquid crystal panel 13, and obtains an average luminance of the image in accordance with the RGB signal.

Figure 5:
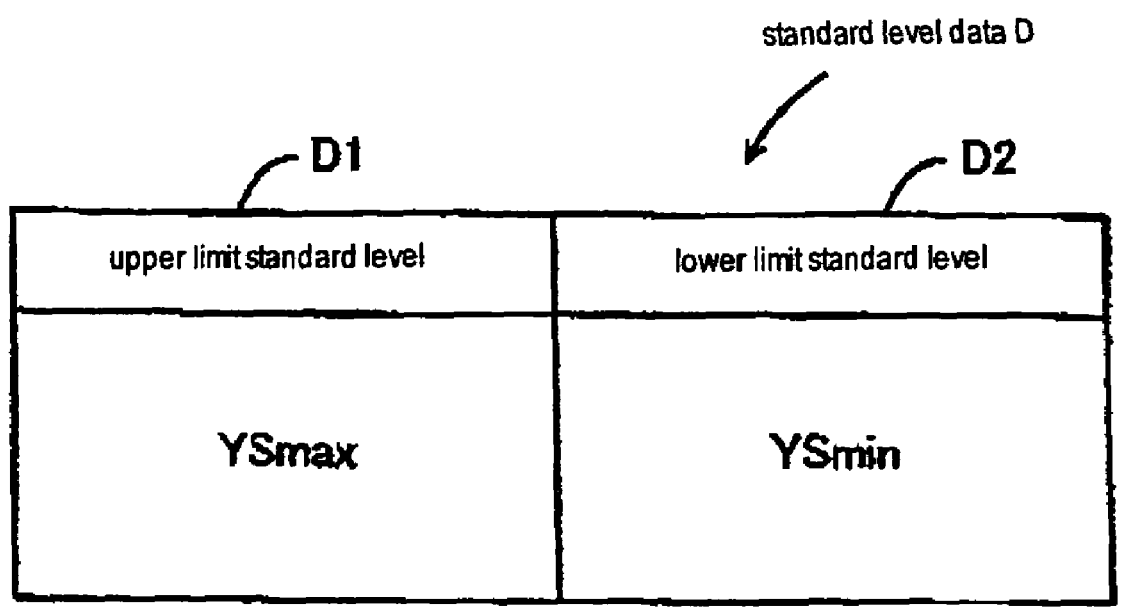
FIG. 5 shows one example of a standard level data.

In this embodiment, as described below, an average luminance Y of a predetermined area or a plurality of areas of the image will be detected. The microcomputer 14 compares the detected average luminance Y with standard level data previously stored in the ROM 14c (which is set in every liquid crystal television apparatus, and shows a standard luminance which is set in accordance with specification of a liquid crystal panel of each liquid crystal television apparatus), and transmits a predetermined control signal to the dynamic range switch circuit 12c2 in accordance with the comparison result. One example of the standard level data stored in the ROM 14c is shown in FIG. 5. In FIG. 5, a standard level data D includes a maximum standard level D1 and a minimum standard level D2.

In this embodiment, a level YSmax is set as the maximum standard level D1, and a level YSmin is set as the minimum standard level D2. The microcomputer 14 compares the above-described average luminance Y with the levels YSmax and YSmin. The dynamic range switch circuit 12c2 changes an analog-to-digital conversion range of the analog-to-digital conversion circuit 12a1 in accordance with the inputted control signal. In other words, the dynamic range is changed. As a result, the dynamic range of the analog-to-digital conversion circuit 12a1 can be dynamically switched in accordance with the image displayed on the liquid crystal panel 13, reducing the white blur and black blur of the image.

Figure 6:
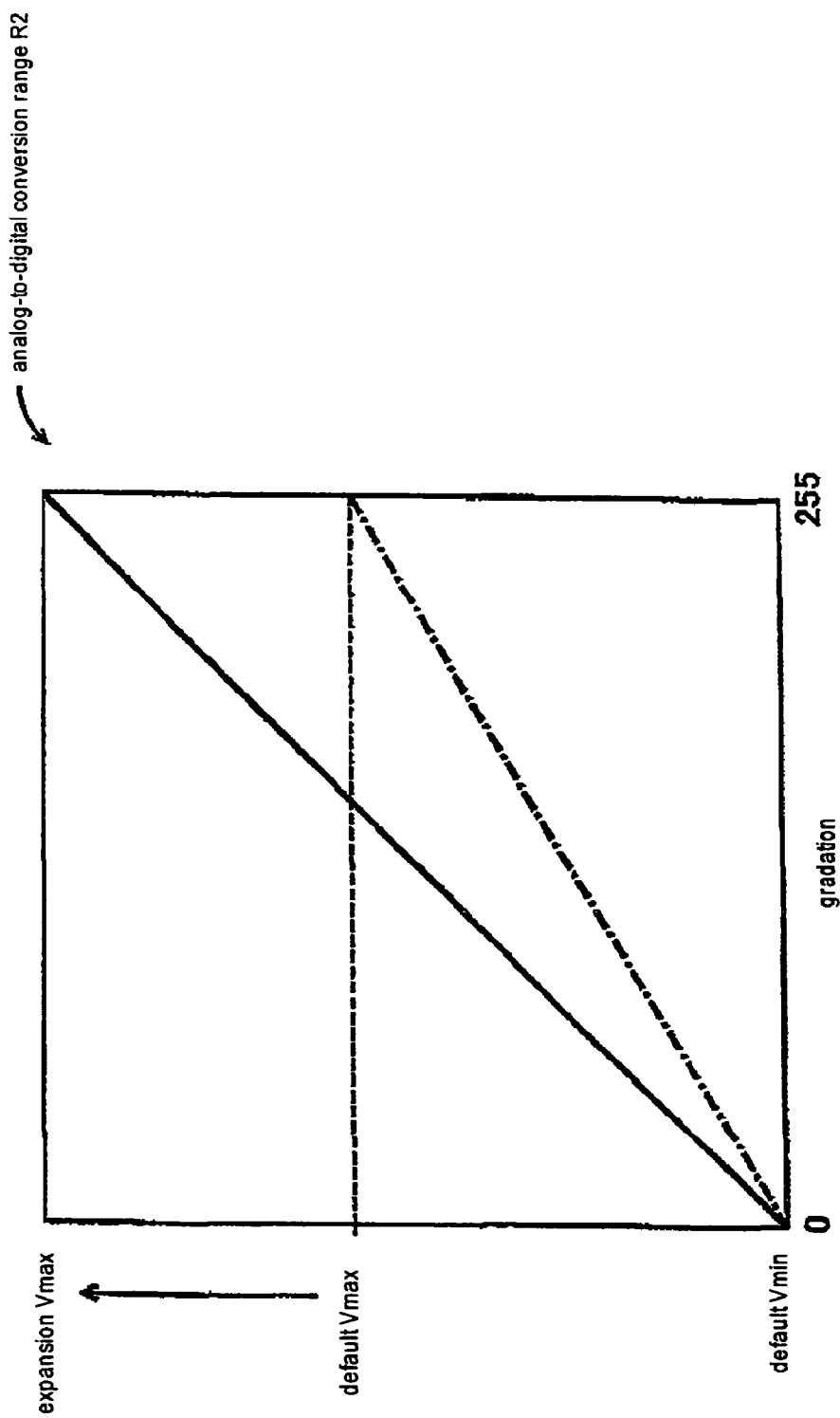
FIG. 6 is a block diagram showing a configuration of an analog-to-digital conversion range in which a default Vmax is expanded to an expansion Vmax.

FIG. 6 is a schematic diagram showing one example of the analog-to-digital conversion range which is changed when the average luminance Y in the comparison result is equal to or over the level YSmax. In FIG. 6, the above-described maximum voltage Vmax is a default Vmax, which is a predetermined initial value, and the minimum voltage Vmin is a default Vmin, which is a predetermined initial value. When the average luminance Y detected in the level detection circuit 12c1 is equal to or over the level YSmax, it is predicted that white blur occurs in an image of the liquid crystal panel 13. Therefore, in this case, by selecting an analog-to-digital conversion range R2 in which the default Vmax is expanded to an expansion Vmax by a predetermined width, the dynamic range is changed. As a result, even when the composite video signal S1 equal to or over the default Vmax, the composite video signal S1 can be provided with a gradation value, preventing white blur of the composite video signal S1.

Figure 7:
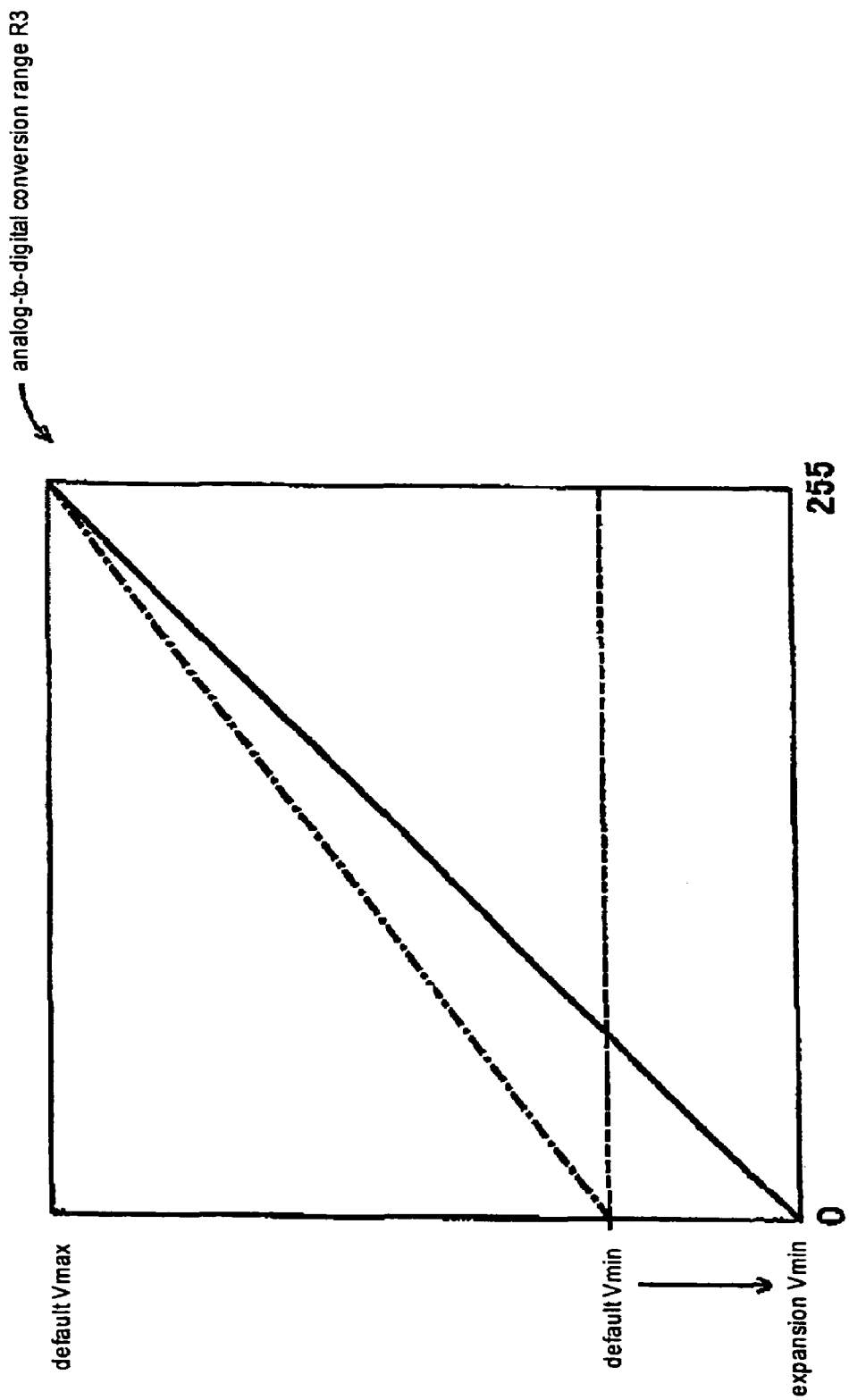
FIG. 7 is a block diagram showing a configuration of an analog-to-digital conversion range in which a default Vmin is expanded to an expansion Vmin.

On the other hand, FIG. 7 is a schematic diagram showing one example of the analog-to-digital conversion range when the average luminance Y in the above-described comparison result is equal to or under the level YSmin. In FIG. 7, the above-described maximum voltage Vmax is a default Vmax, which is a predetermined initial value, and the minimum voltage Vmin is a default Vmin, which is a predetermined initial value. When the average luminance Y detected in the level detection circuit 12c1 is equal to or under the level YSmin, it is predicted that black blur occurs in an image of the liquid crystal panel 13. Therefore, in this case, by selecting an analog-to-digital conversion range R3, the dynamic range is changed. As a result, even when the composite video signal S1 equal to or under the default Vmin, the composite video signal S1 can be provided with a gradation value, preventing black blur of the composite video signal S1.

(3) Procedure of a Control Process

Figure 8:
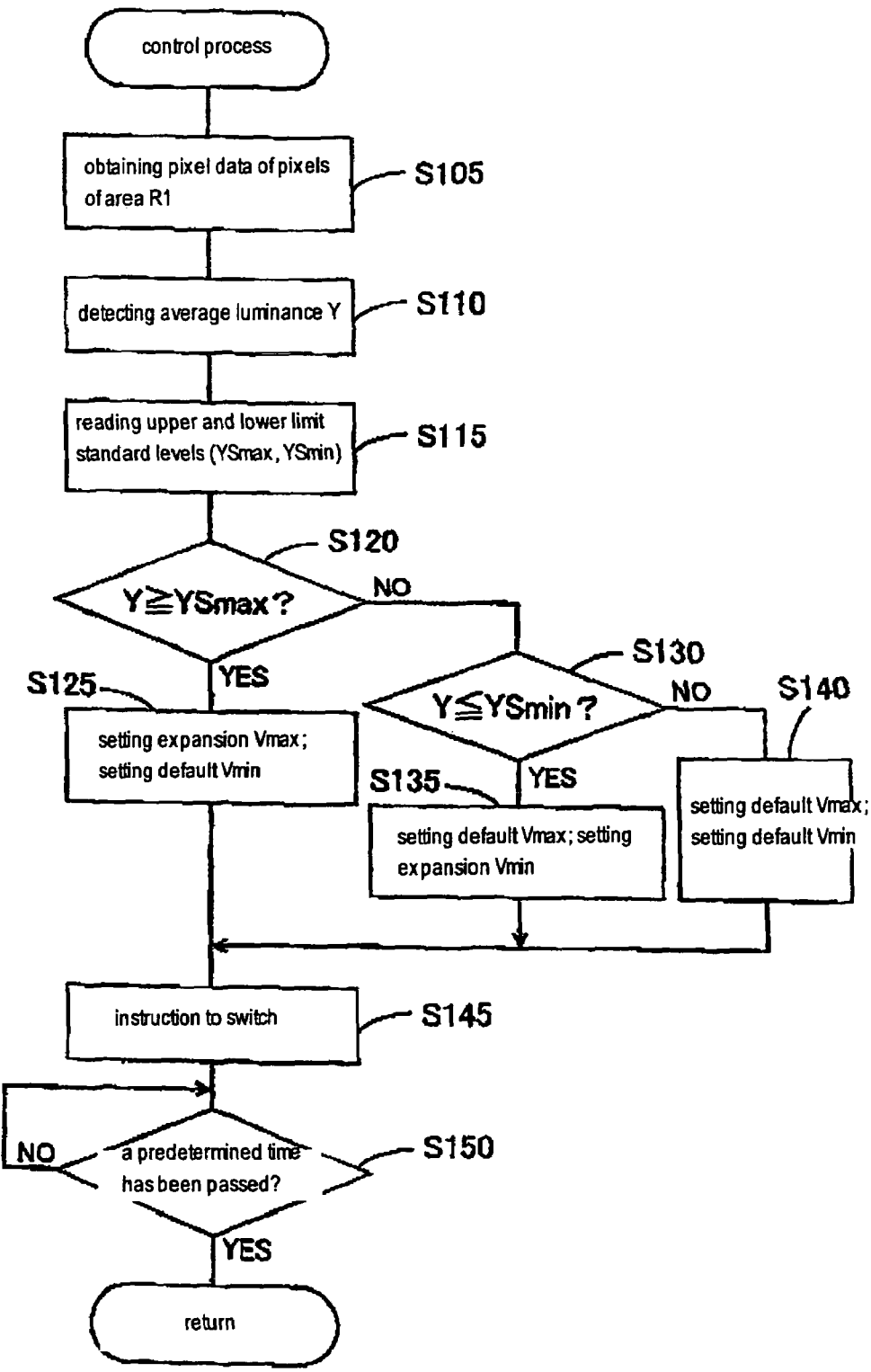
FIG. 8 is a flowchart showing a procedure of control processes.
Figure 9:
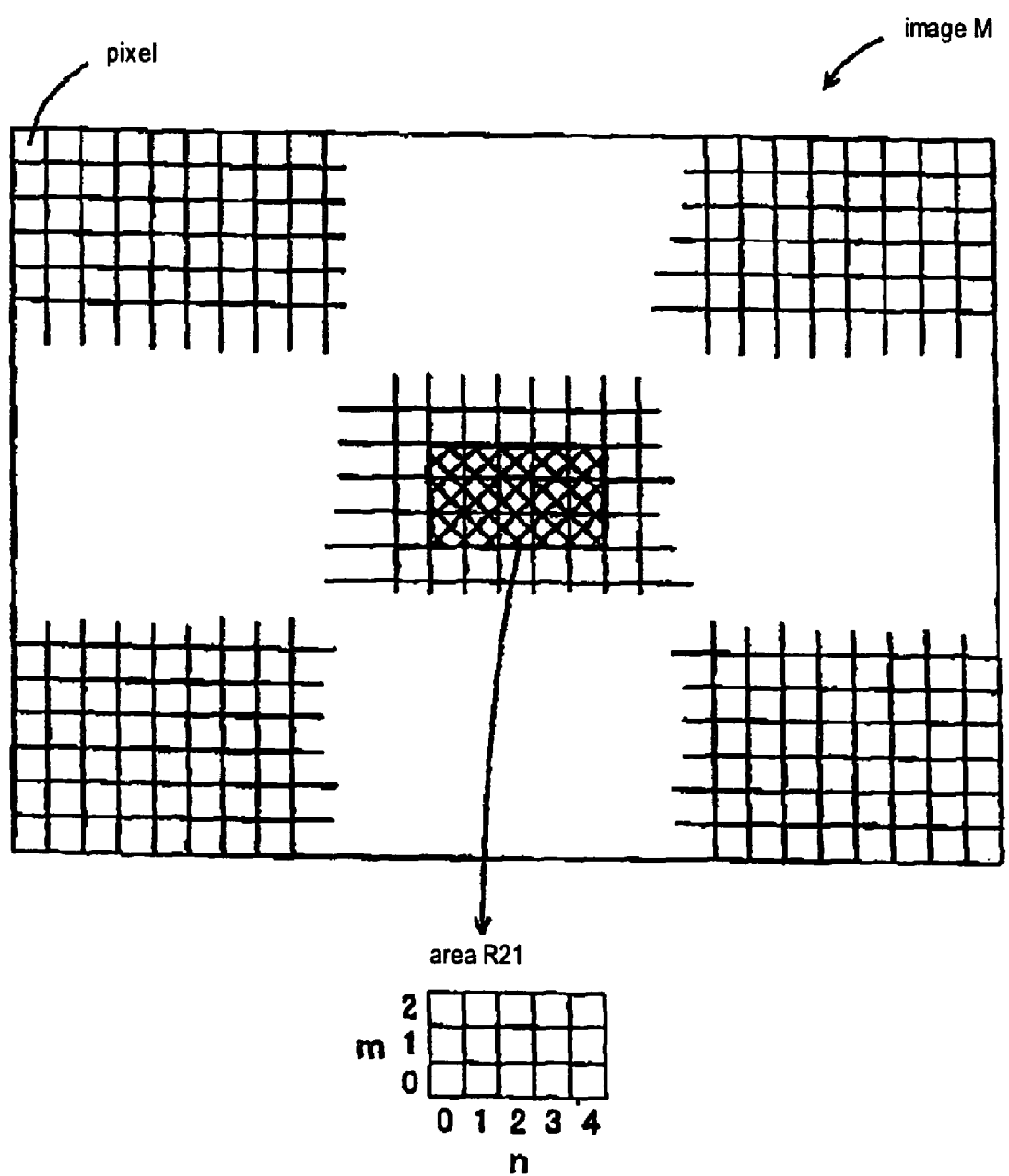
FIG. 9 shows one example of areas where an average luminance of an image displayed on a liquid crystal panel is detected.

Next, a control process in this embodiment executed in the above-described control circuit 12c and microcomputer 14 are explained. FIG. 8 is a flowchart showing a procedure of this control process. In FIG. 8, the level detection circuit 12c1 accesses the output process circuit 12b3 to obtain pixel data comprised of RGB signals of pixels (m, n)=(0, 0)–(2, 4) forming an area R21 positioned at a center portion of an image M which is comprised of a plurality of pixels displayed on the liquid crystal panel 13 and shown in FIG. 9 (step S105). The level detection circuit 12c1 detects the average luminance Y in accordance with the obtained pixel data (step S110).

To detect the average luminance Y, existent various methods for detecting a luminance from an RGB signal may be used. Next, the microcomputer 14 obtains the detected average luminance Y from the level detection circuit 12c1, and reads the level YSmax and level YSmin, which are the standard level data D stored in the ROM 14c (step S115). After the average luminance Y is obtained and the level YSmax and level YSmin are read, it is judged whether the average luminance Y is equal to or over the level YSmax (step S120). When the average luminance Y is judged to be equal to or over the level YSmax, the dynamic range is formed of the expansion Vmax and default Vmin. In other words, the dynamic range is the analog-to-digital conversion range R2. Then, a predetermined control signal showing the analog-to-digital conversion range R2 is outputted to the dynamic range switch circuit 12c2 (step S125).

On the other hand, when the average luminance Y is judged to be under the level YSmax in step S120, it is judged whether the average luminance Y is equal to or under the level YSmin (step S130). When the average luminance Y is judged to be equal to or under the level YSmin, the dynamic range is formed of the default Vmax and expansion Vmin. In other words, the dynamic range is an analog-to-digital conversion range R3. Then, a predetermined control signal showing the analog-to-digital conversion range R3 is outputted to the dynamic range switch circuit 12c2 (step S135). When the average luminance Y is judged to be over the level YSmin in step S130, the dynamic range is formed of default Vmax and default Vmin. In other words, the dynamic range is the analog-to-digital conversion range R1. Then, a predetermined control signal showing the analog-to-digital conversion range R1 is outputted to the dynamic range switch circuit 12c2 (step S140).

The dynamic range switch circuit 12c2 inputs the control signal outputted from the microcomputer 14, and outputs an instruction to switch the analog-to-digital conversion range to the analog-to-digital conversion circuit 12a1 in accordance with the inputted control signal (step S145). The analog-to-digital conversion circuit 12a1 switches the dynamic range in accordance with the inputted switch instruction. In other words, when the switch instruction showing the analog-to-digital conversion range R1 is inputted, the dynamic range is formed of the default Vmax and the default Vmin, between which the composite video signal S1 is properly converted to a digital signal S2 of the 0 to 255 gradation. When the switch instruction showing the analog-to-digital conversion range R2 is inputted, the dynamic range is formed of the expansion Vmax and the default Vmin, between which the composite video signal S1 is properly converted to the digital signal S2 of the 0 to 255 gradation.

When the switch instruction showing the analog-to-digital conversion range R3 is inputted, the dynamic range is formed of the default Vmax and the expansion Vmin, between which the composite video signal S1 is properly converted to the digital signal S2 of the 0 to 255 gradation. The processes in steps S105 to S145 are executed every predetermined time (step S150). As a result, the process load is reduced, and the dynamic range is switched to adapt the image M every predetermined time, so that white blur and black blur of the image M are reduced.

Figure 10:
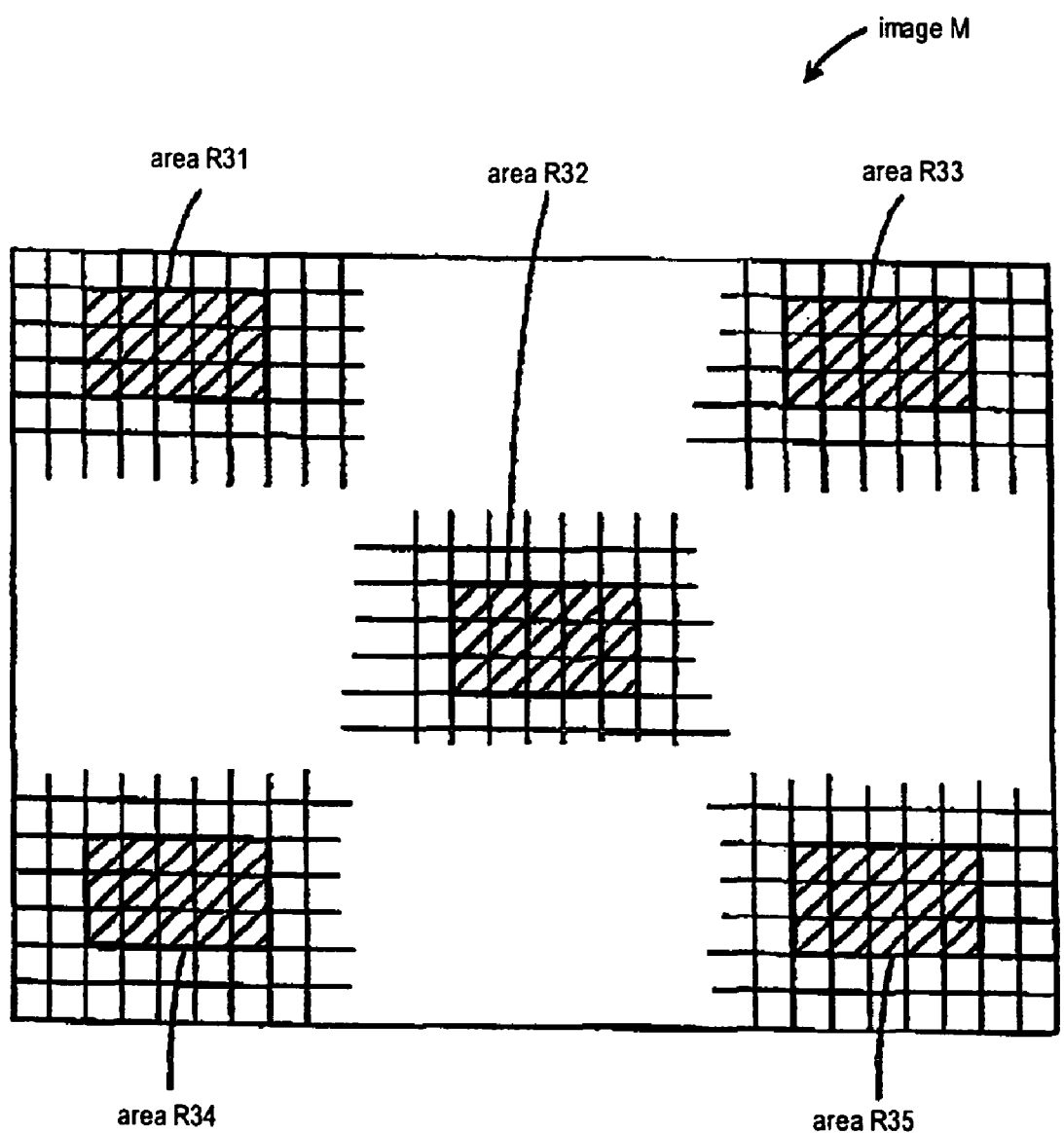
FIG. 10 shows one example other areas in which an average luminance of an image displayed on a liquid crystal panel is detected.

In the above-described embodiment, the average luminance Y is detected in accordance with the pixel data of the pixels of the area R21 positioned at the center portion of the image M. A main portion of the image M is often displayed on the center portion of the image M, so that a characteristic of the image M can be obtained from the average luminance Y of the area R21. On the other hand, the method for detecting the average luminance Y of the image M is not limited to the method for detecting the average luminance of the area R21 on the center portion of the image M. As shown in FIG. 10, the average luminance Y may be obtained by averaging pixel data of pixels forming areas R31 to R35 of the image M. The detection method is not limited to this. An average luminance of properly specified areas of the image M may be detected as the average luminance Y.

(4) Alternatives

In the above-described embodiment, to expand the dynamic range, the default Vmax and default Vmin are expanded in accordance with the expansion Vmax and expansion Vmin, which are constant values. The dynamic range may be expanded in accordance with the expansion Vmax and expansion Vmin, which are constant values. The expansion widths may be also properly changed. As described above, by properly changing the expansion widths, S/N ratios of the composite video signal S1 and digital signal S2 can be preferably improved. In the next embodiment, the expansion Vmax and expansion Vmin are changed in accordance with a difference between the detected average luminance Y and the levels YSmax and YSmin.

Figure 11:
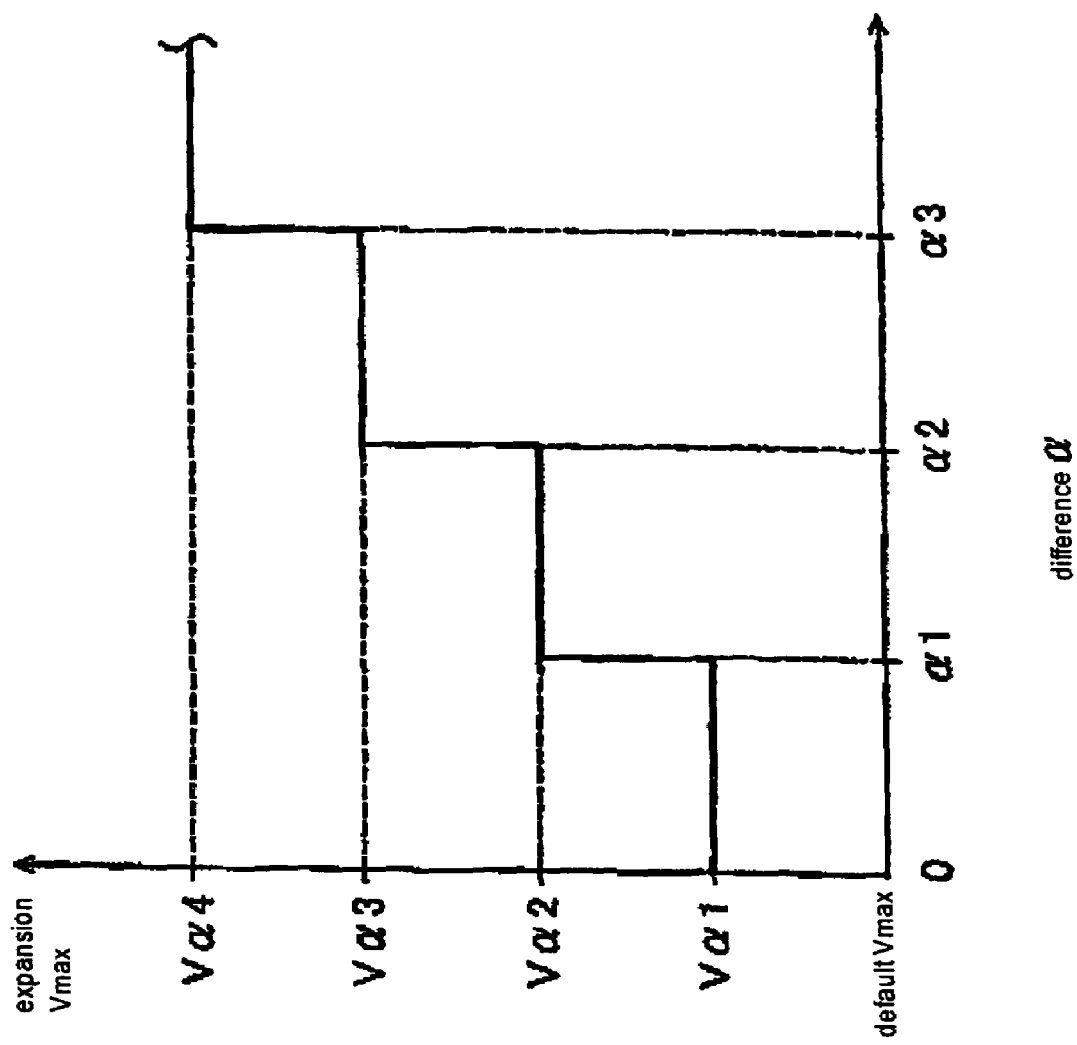
FIG. 11 is a diagram showing a relationship when the expansion Vmax is changed in accordance with a difference between the average luminance Y and a level YSmax.

FIG. 11 is a relationship diagram showing relationship where the expansion Vmax is changed in accordance with a difference between the average luminance Y and the level YSmax when the average luminance Y is equal to or over the level YSmax. In FIG. 11, the horizontal line shows a difference a between the average luminance Y and level YSmax, and vertical line shows the expansion Vmax. In this embodiment, the expansion Vmax is an expansion V$\alpha$1 when the difference $\alpha$ is equal to or over 0 and under 1, the expansion Vmax is an expansion V$\alpha$2 when the difference $\alpha$ is equal to or over 1 and under 2, the expansion Vmax is an expansion V$\alpha$3 when the difference $\alpha$ is equal to or over 2 and under 3, and the expansion Vmax is an expansion V$\alpha$4 when the difference $\alpha$ is equal to or over 3. As shown in FIG. 11, the expansion Vmax changes, where V$\alpha$1<V$\alpha$2<V$\alpha$3<V$\alpha$4.

Figure 12:
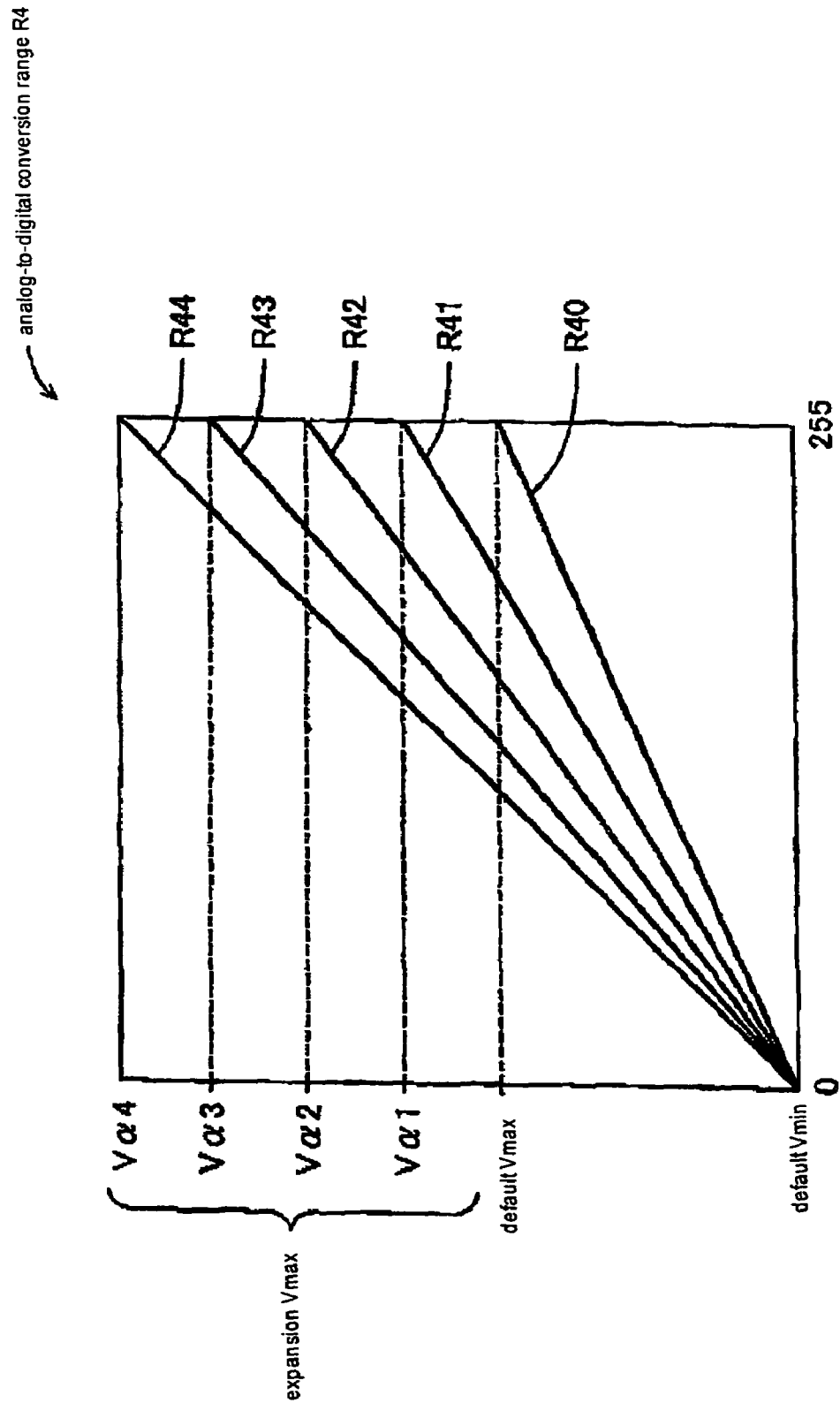
FIG. 12 is a block diagram showing a configuration of an analog-to-digital conversion range when the expansion Vmax is changed in accordance with the difference between the average luminance Y and a level YSmax.

AS shown in FIG. 12, by setting an analog-to-digital conversion range R4 in accordance with this difference a, the dynamic range of the analog-to-digital conversion circuit 12a1 is set. In FIG. 12, the analog-to-digital conversion range R40 shows the default dynamic range, the analog-to-digital conversion range R41 shows the dynamic range when the difference $\alpha$ is equal to or over 0 and under $\alpha$1, the analog-to-digital conversion range R42 shows the dynamic range when the difference $\alpha$ is equal to or over $\alpha$1 and under $\alpha$2, the analog-to-digital conversion range R43 shows the dynamic range when the difference $\alpha$ is equal to or over $\alpha$2 and under $\alpha$3, and the analog-to-digital conversion range R44 shows the dynamic range when the difference $\alpha$ is equal to or over $\alpha$3.

Figure 13:
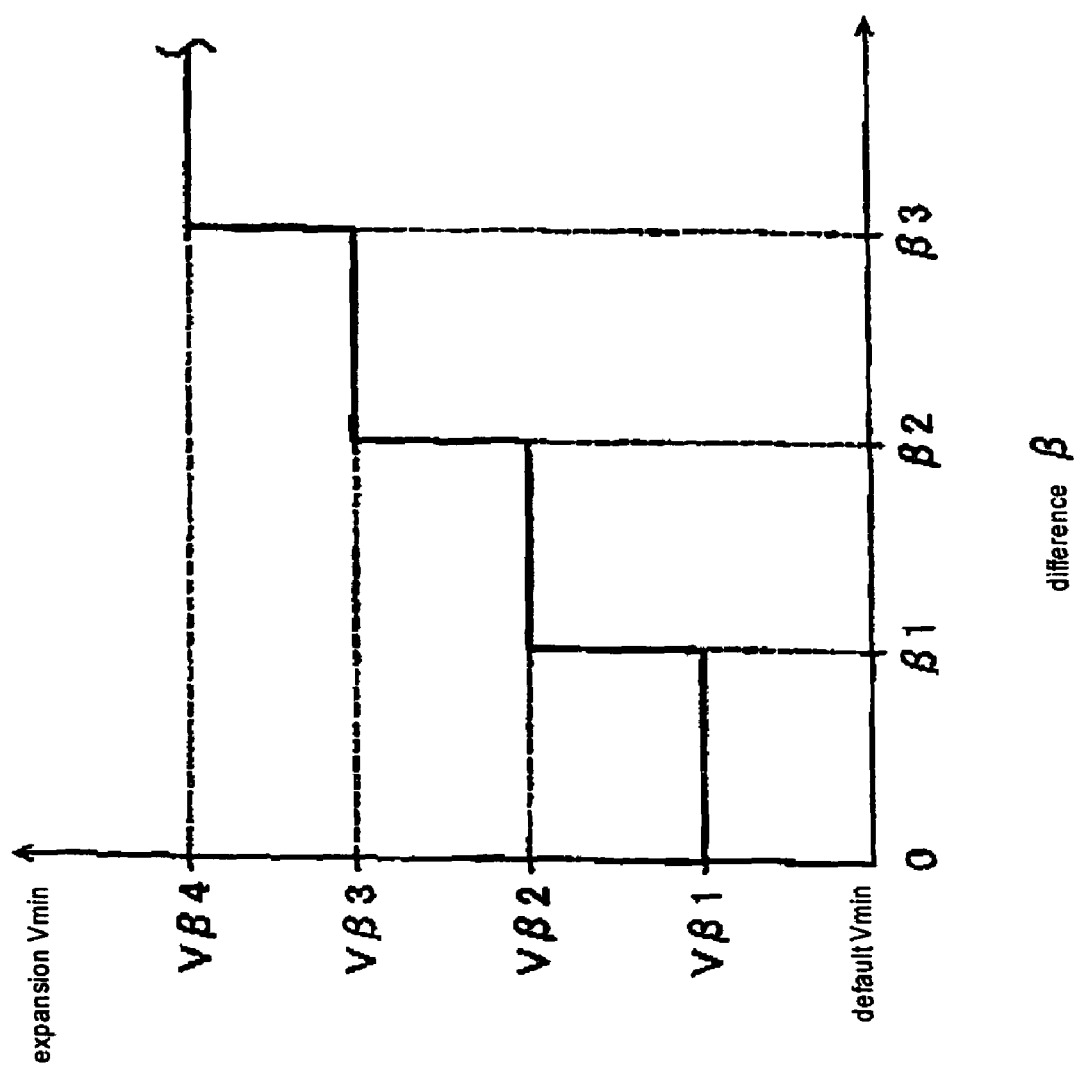
FIG. 13 is a diagram showing a relationship when the expansion Vmin is changed in accordance with a difference between the average luminance Y and a level YSmax.

FIG. 13 is a relationship diagram showing relationship where the expansion Vmin is changed in accordance with a difference between the average luminance Y and the level YSmin when the average luminance Y is equal to or under the level YSmin. In FIG. 13, the horizontal line shows a difference $\beta$ between the average luminance Y and level YSmin, and a vertical line shows the expansion Vmin. In this embodiment, the expansion Vmin is an expansion V$\beta$1 when the difference $\beta$ is equal to or over 0 and under $\beta$1, the expansion Vmin is an expansion V$\beta$2 when the difference $\beta$ is equal to or over $\beta$1 and under $\beta$2, the expansion Vmin is an expansion V$\beta$3 when the difference $\alpha$ is equal to or over $\beta$2 and under $\beta$3, and the expansion Vmin is an expansion V$\beta$4 when the difference $\beta$ is equal to or over $\beta$3. As shown in FIG. 11, the expansion Vmin changes, where V$\beta$1<V$\beta$2<V$\beta$3<V$\beta$4.

Figure 14:
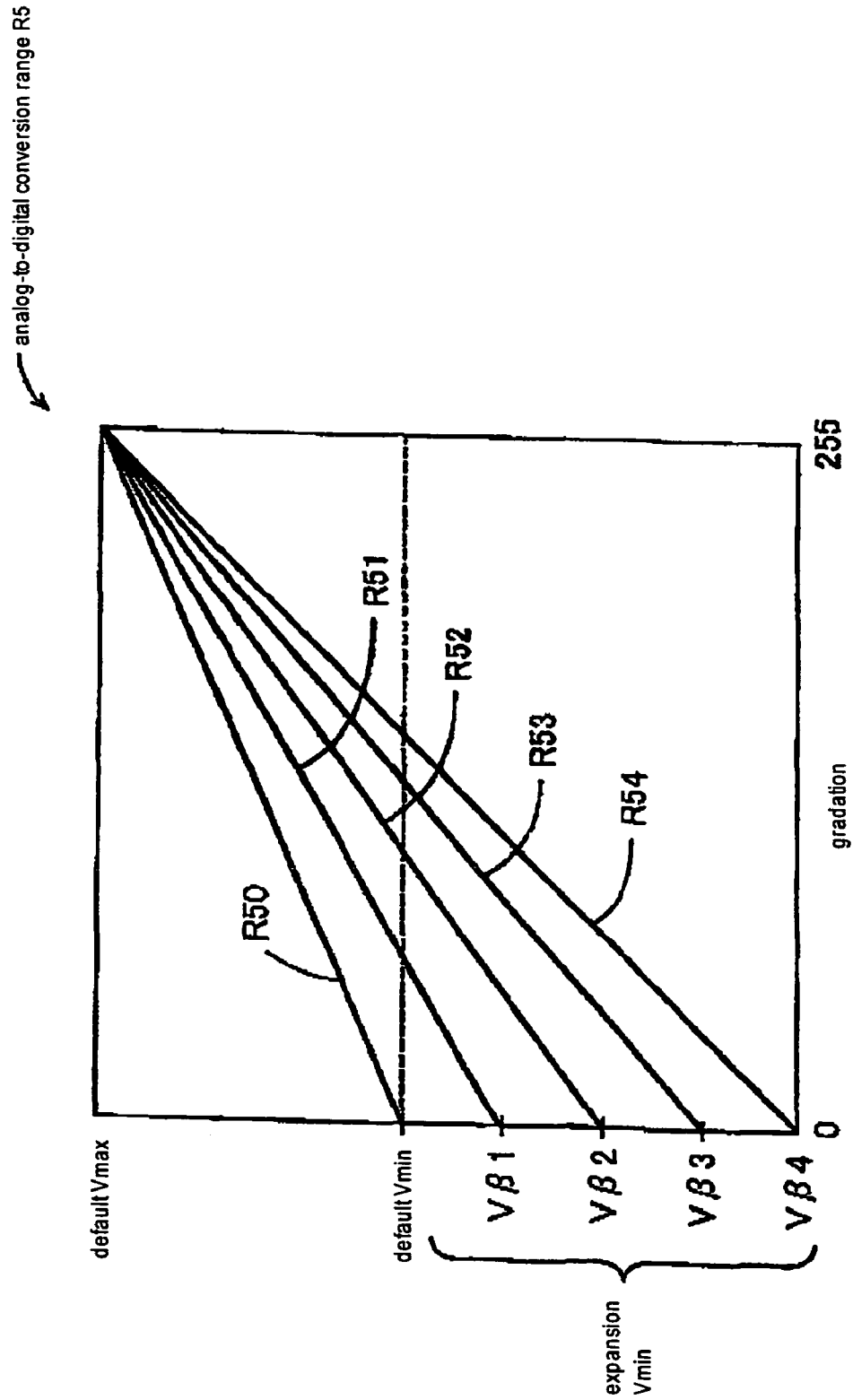
FIG. 14 is a block diagram showing a configuration of an analog-to-digital conversion range when the expansion Vmin is changed in accordance with the difference between the average luminance Y and a level YSmax.

As shown in FIG. 14, by setting an analog-to-digital conversion range R5 in accordance with this difference $\beta$, the dynamic range of the analog-to-digital conversion circuit 12a1 is set. In FIG. 14, the analog-to-digital conversion range R50 shows the default dynamic range, the analog-to-digital conversion range R51 shows the dynamic range when the difference $\beta$ is equal to or over 0 and under $\beta$1, the analog-to-digital conversion range R52 shows the dynamic range when the difference $\beta$ is equal to or over $\beta$1 and under $\beta$2, the analog-to-digital conversion range R53 shows the dynamic range when the difference $\beta$ is equal to or over $\alpha$2 and under $\beta$3, and the analog-to-digital conversion range R54 shows the dynamic range when the difference $\beta$ is equal to or over $\beta$3.

(5) Correspondence to the Present Invention

The correspondence between the configuration of the above-described embodiments and the configuration of the present invention is added. A liquid crystal panel of the present invention corresponds to the liquid crystal panel 13. A tuner of the present invention corresponds to the tuner 11. An analog-to-digital conversion circuit of the present invention corresponds to the analog-to-digital conversion circuit 12a1. A signal process circuit of the present invention corresponds to the digital signal process circuit 12a except the analog-to-digital conversion circuit 12a1. A flame memory circuit of the present invention corresponds to the flame memory 12b4. A liquid crystal driver circuit of the present invention corresponds to the liquid crystal driver circuit 12b except the flame memory 12b4. A function of an image luminance detection circuit of the present invention is achieved in the level detection circuit 12c1 of the control circuit 12c. A function of a determination circuit of the present invention is achieved in the microcomputer 14. A conversion control circuit of the present invention is achieved in the dynamic range switch circuit 12c2 and microcomputer 14.

An analog video signal input circuit of the present invention corresponds to the tuner 11 for inputting the composite video signal S1 and enabling it to be outputted to the video signal process circuit 12, to the external input terminals 15a to 15c, and to the selector circuit 15 for selecting one of the external input terminals 15a to 15c. A digital video signal generation circuit of the present invention corresponds to the video signal process circuit 12 for generating the digital video signal from the inputted composite video signal S1. An image luminance detection circuit of the present invention corresponds to the level detection circuit 12c1 of the control circuit 12c. A conversion control circuit of the present invention corresponds to the microcomputer 14 and dynamic range switch circuit 12c2.

(6) Conclusion

The video signal process circuit 12 includes the control circuit 12c having the level detection circuit 12c1 and dynamic range switch circuit 12c2. The average luminance Y of the image displayed on the crystal liquid panel 13 via the liquid crystal driver circuit 12b is detected in the control circuit 12c and microcomputer 14. The upper limit of the dynamic range is expanded when the average luminance Y is equal to or over the level YSmax. As a result, the signal level of the composite video signal S1 in which the white blur can occur can be converted to the digital signal S2 without being limited by the upper limit gradation, so that the white blur can be reduced to improve the quality of the image. Additionally, the lower limit of the dynamic range is expanded when the average luminance Y is equal to or under the level YSmin. As a result, the signal level of the composite video signal S1 in which the black blur can occur can be converted to the digital signal S2 without being limited by the lower limit gradation, so that the black blur can be reduced to improve the quality of the image.

The foregoing invention has been described in terms of preferred embodiments. However, those skilled, in the art will recognize that many variations of such embodiments exist. Such variations are intended to be within the scope of the present invention and the appended claims.

What is claimed is:

1. A liquid crystal television apparatus comprising:
   a liquid crystal panel whose display surface is formed of a plurality of pixels;
   a tuner for receiving a television signal of a desired frequency corresponding to a television broadcast band via an antenna, for selecting only a required signal from the received television signal and applying high frequency amplification to the selected signal, and for outputting an analog video signal converted to an intermediate frequency signal;
   an analog-to-digital conversion circuit for inputting the analog video signal from the tuner and for converting a predetermined signal level range of the analog video signal to a digital signal having gradation corresponding to the signal levels;
   a signal process circuit for generating a digital video signal by applying a predetermined digital signal process to the converted digital signal to generate a digital video signal;
   a flame memory circuit for storing a digital video signal forming an image for one screen displayed on the liquid crystal panel while inputting the generated digital video signal;
   a liquid crystal driver circuit for displaying the image on the liquid crystal panel while applying a predetermined signal process to the digital video signal stored in the flame memory circuit;
   a microcomputer for controlling the circuits,
wherein
   the analog-to-digital conversion circuit changes the signal level range;
and wherein
the apparatus further comprises:
   an image luminance detection circuit for detecting a luminance of a predetermined area of the image or an average luminance of a plurality of areas of the image in accordance with the digital video signal stored in the flame memory;
   a determination circuit for determining whether the detected luminance of the predetermined area or the average luminance of a plurality of the areas is equal to or over a threshold showing that the image is bright; and
   a conversion control circuit for outputting a predetermined control signal to the analog-to-digital conversion circuit and expanding an upper limit of a signal level range of the analog video signal to be converted to the digital signal to change the signal level range when the detected luminance of the predetermined area or the average luminance of a plurality of the areas is determined to be equal to or over the threshold.

2. A liquid crystal television apparatus for generating a digital video signal in accordance with an analog video signal and displaying an image based on the digital video signal on pixels of a liquid crystal panel, comprising:
   an analog video signal input circuit for inputting the analog video signal;
   a digital video signal generation circuit for generating a digital video signal while converting the analog video signal having a signal level range defined by predetermined upper and lower limits to a digital signal having gradation corresponding to the signal levels;
   an image luminance detection circuit for detecting a luminance of the image in accordance with the generated digital video signal, with the image luminance detection circuit detecting an average luminance of pixels of a predetermined area of the image when detecting a luminance of the image; and
   a conversion control circuit for determining whether the detected luminance is equal to or over a predetermined threshold showing that an image is bright and expanding the upper limit of the signal level range when the luminance is equal to or over the predetermined threshold.

3. The liquid crystal television apparatus according to claim 2, wherein the conversion control circuit determines whether the detected luminance is equal to or under a threshold showing that an image is dark, and expands a lower limit of the signal level range when the detected luminance is equal to or under the threshold.

4. The liquid crystal television apparatus according to claim 2, wherein the image luminance detection circuit detects an average luminance of pixels of a plurality of areas of the image when detecting the luminance of the image.

5. The liquid crystal television apparatus according to claim 2, wherein the image luminance detection circuit detects the luminance every predetermined time.

6. The liquid crystal television apparatus according to claim 2, wherein the conversion control circuit calculates a difference between the detected luminance and a threshold showing that the image is bright, and expands the upper limit in accordance with the calculated difference.

7. The liquid crystal television apparatus according to claim 2, wherein the conversion control circuit calculates a difference between the detected luminance and a threshold showing that the image is dark, and expands the lower limit in accordance with the calculated difference.

* * * * *